W. H. PLUMB,

Assignor to J. A. STERLING.

2 Sheets—Sheet 1.

Jigger for Separating Ores.

No. 8,653. Reissued April 1, 1879.

WITNESSES:

Chas. Nora

C. Sedgwick

INVENTOR:

W. H. Plumb

BY Munn & Co

ATTORNEYS.

W. H. PLUMB,

Assignor to J. A. STERLING.

Jigger for Separating Ores.

No. 8,653. Reissued April 1, 1879.

WITNESSES:

Chas. Nichols

C. Sedgwick

INVENTOR:

W. H. Plumb

BY Munn & Co

ATTORNEYS.

UNITED STATES PATENT OFFICE.

WILLIAM H. PLUMB, OF PATERSON, NEW JERSEY, ASSIGNOR TO JOSEPH A. STERLING, OF NEW YORK CITY.

IMPROVEMENT IN JIGGERS FOR SEPARATING ORES.

Specification forming part of Letters Patent No. 140,535, dated July 1, 1873; Reissue No. 8,653, dated April 1, 1879; application filed July 9, 1878.

*To all whom it may concern:*

Figure 1:
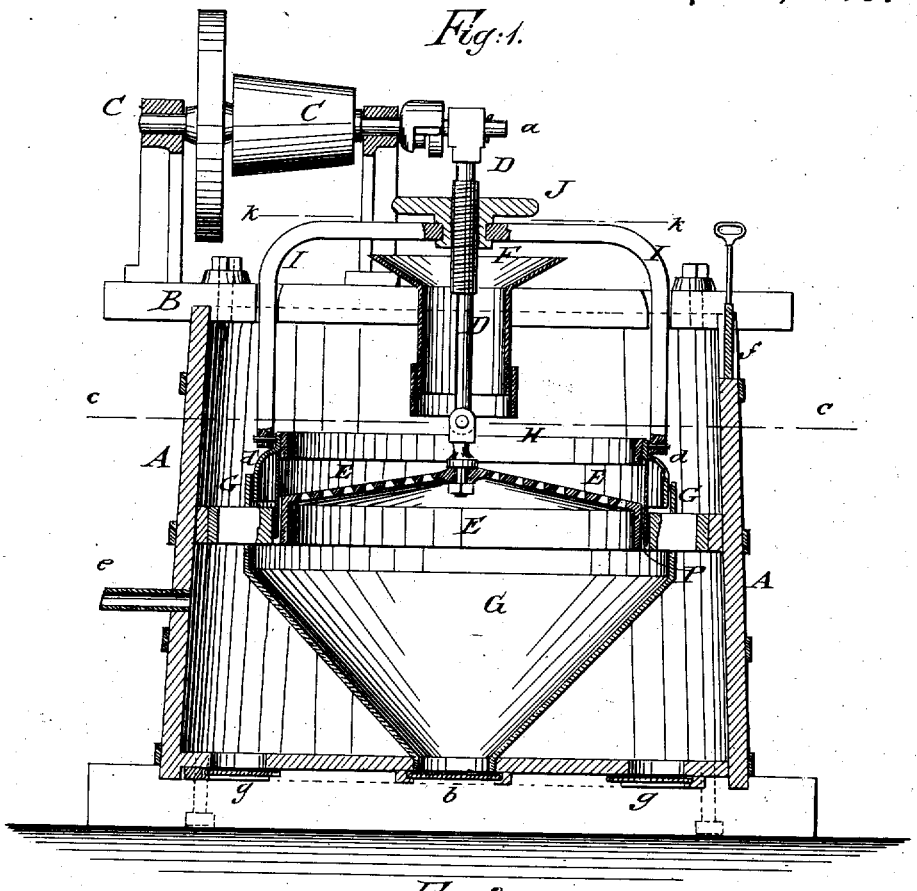
Figure 2:
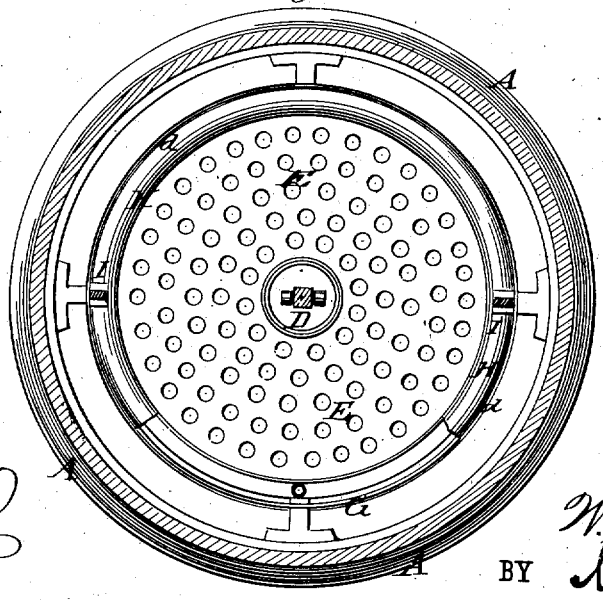
Figure 3:
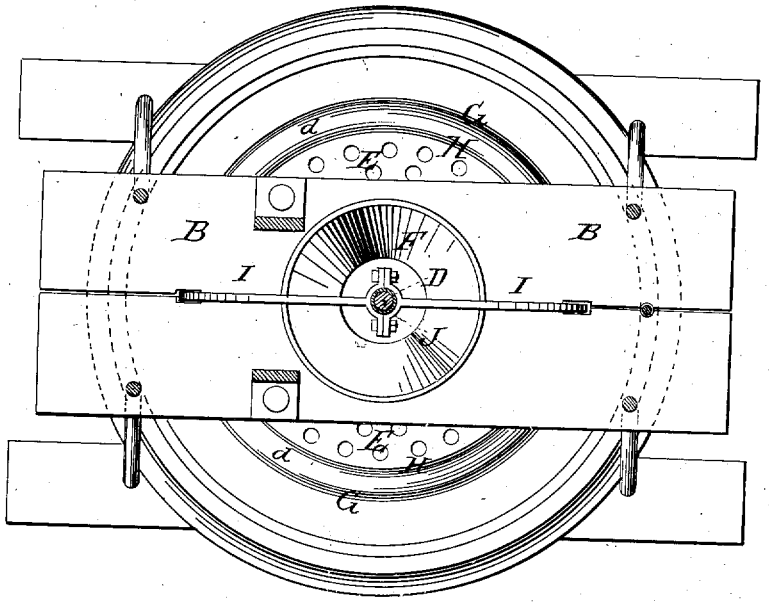
Figure 4:
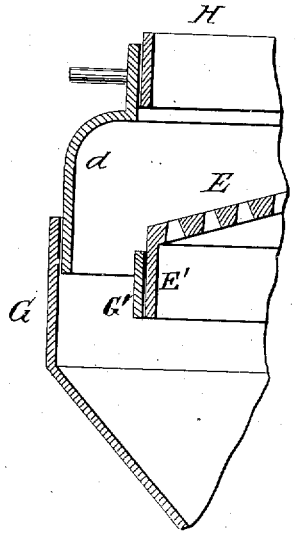

Be it known that I, WILLIAM H. PLUMB, of Paterson, in the county of Passaic and State of New Jersey, have invented a new and Improved Jigger for Separating Ore, of which the following is a specification:

In the accompanying drawings, Figure 1 represents a vertical central section of my improved jigger for separating ores. Fig. 2 is a horizontal section of the same on line *c c*, Fig. 1. Fig. 3 is a top view thereof, partly in section, the line *k k*, Fig. 1, indicating the plane of the section; and Fig. 4 is a detail vertical section, showing the relative positions of the grate, adjustable ring, and stationary discharge-hopper.

Similar letters of reference indicate corresponding parts.

The object of this invention is to produce an apparatus for separating different kinds of mineral products in accordance with their varying degrees of specific gravity and varying quantitative proportions, such as ore, and also for separating coal from heavier admixture, such as slate and other mineral substances. The apparatus may be regulated with great facility, as regards stroke and velocity, to the size of the material and to the percentage of the lighter and heavier minerals to be separated, so as to accomplish the separation in rapid, reliable, and perfect manner.

The invention consists of a vertically-reciprocating and centrally-suspended perforated grate, that receives the ore or coal to be separated, and of a vertically-adjustable ring, which is raised or lowered in conformity to the proportionate quantities and the specific gravities of the materials to be separated. The grate is made circular and conical, with tapering perforations, that are larger at the bottom than at the top of the grate, and smaller than the material to be separated, so as to admit the passage of the water and shed the heavy material over the edge of the grate.

The adjustable ring is provided with an exterior flange, that projects outwardly and downwardly and overlaps or enters the mouth of a stationary funnel-shaped hopper, into which the heavier material is discharged from the grate, while the lighter material passes over the top of the ring into an outer receptacle or tank, it being, by said flange, prevented from entering the hopper or inner receptacle. The ring is hung to a yoke, which is connected in adjustable manner to the rod on which the grate is suspended.

Referring to the drawings, A represents the outer receptacle or tank, in which my improved jig for ore, coal, and other materials is placed. B is a frame, that is arranged above said tub and attached thereto, having bearings for supporting a horizontal driving-shaft, C, that receives rotary motion by any approved transmitting mechanism. The shaft C connects by a crank, *a*, with a vertical rod, D, that is suspended centrally into the tank, and pivoted at its lower end to a central bearing of a grate, E. This grate E is made of circular and preferably slightly conical shape, so as to throw the ore or coal dropped thereon toward the edge of the grate.

The ore or coal to be separated is conducted to the grate by means of a stationary funnel or tube, F, which is secured to frame B, and arranged around the suspension-rod D of the grate.

Below the grate E is arranged a conically-tapering hopper or receiver, G, that extends up to a level with the grate, being made with a larger diameter than the grate, so as to leave an annular opening around the same. The grate has a circumferential downwardly-extending flange, E′, by which it is guided along a fixed interior ring, G′, of the hopper G, as shown in Fig. 4, so as to be steadily vibrated up and down. The hopper G discharges the material through a bottom opening, *b*, of the tank.

A ring, H, of a diameter about equal to that of the grate E, is hung to a yoke, I, that is readily adjusted by a nut, J, on the threaded upper portion of the suspension-rod D. The yoke is swiveled on the nut, so that by turning the latter the yoke with the ring H may be moved up and down at will. The ring H is guided by steadying-pins in holes of the radial arms that support the inner guide-ring of the grate, and also arranged with an outwardly and downwardly projecting flange, *d*, that extends from the lower end of the ring downward, and either enters closely into or embraces the mouth of the hopper G, said flange being of such length as always to be in contact with the funnel G, no matter how far the ring is raised above the grate.

Water is admitted to the tank A at or near the middle through a supply-pipe, *e*, and is discharged at the top of the tank through a gate, *f*. The bottom of the tank outside of the hopper is also arranged with openings *g*, for discharging the materials that are worked off over the adjustable ring H.

The ore, coal, or other materials to be separated are conducted through the funnel F upon the grate E, the ring being first adjusted to the material to be worked upon. When the heavy substances are in excess of the lighter the ring is raised higher, thus giving a greater depth for the materials; but when the heavier products are comparatively small in quantity the ring is lowered, which allows of quicker circulation of water, thus carrying the greater body of lighter materials over the ring with greater rapidity. The vibrating motion of the grate forces the water through the materials, and works the lighter parts toward the top while the heavier parts are settling on the grate. The tapering holes of the grate facilitate the passage of the water, while the central suspension and guiding of the grate causes the uniform motion and discharge of the heavy products over the edge of the grate.

The discharge of the bottoms is regulated by the larger or smaller size of the opening between the grate and ring, which is readily controlled by the operator by turning the nut of the yoke. The lighter materials flow over the top of the ring into the tank, and are discharged through the bottom openings.

The separating of the heavier and lighter parts takes place continuously, the stroke and velocity being arranged in proportion to the size of the materials—quicker and shorter with smaller, and slower and longer with larger, sized coal or materials. Coal, ore, and similar mineral products may, therefore, be quickly and effectively separated, whatever the quantitative proportions and specific gravities of the heavier and lighter substances.

I am aware that it is not new in jiggers to use a fixed grate that opens to discharge the ore after it has been agitated by a piston working above it, or to use a grate connected with and horizontally reciprocated by crank-rods; but neither of these will effect the object which I have in view—namely, to keep the bottoms or layer of heavier particles perfectly level in spite of the lost motion, so that there will be an uninterrupted circulation of water and separation of the lighter from the heavier products. By my central suspension of the grate I accomplish this desirable object, and am enabled to shed the lighter particles evenly around the entire circumference of the ring, which cannot be the case when the grate is suspended at two points. If the grate is taken hold of at two points where lost motion occurs, there is an inevitable displacement of the bottoms, the result being a partial separation only. This is particularly apparent when separating the impurities from coal with a jigger.

Having thus described my invention, I claim as new and desire to secure by Letters Patent—

1. In a jigger for separating mineral products, the combination of a vibrating grate with a ring that moves therewith and forms an annular discharge-opening around the grate, substantially as and for the purpose set forth.

2. In a jigger for separating mineral products, the combination of the vibrating grate with a vertically-adjustable ring that is arranged above and nearly in line with the rim of the grate, substantially as specified.

3. In a jigger for separating mineral products, a vibrating grate, combined with a vertically-adjustable ring that vibrates with the grate, substantially as and for the purpose set forth.

4. In a jigger for separating mineral products, the combination of a vertically reciprocating and guided grate and of a vertically-adjustable ring having outwardly and downwardly projecting flange with a lower stationary discharge-hopper, as and for the purpose described.

5. A jigger in which the grate is suspended at its center from a vertically-reciprocating rod, as and for the purpose specified.

6. In a jigger for separating mineral products, the combination of a water-tank and of a stationary hopper therein, both having separate bottom discharge-openings, with a vibrating and guided grate, and with a vertically-adjustable ring having outer downwardly-extending flanges to produce the separate discharge of the lighter and heavier products, substantially as set forth.

7. In a jigger for separating mineral products, the combination of the ring H, suspending-yoke I, adjustable nut, and the threaded suspension-rod of the grate, substantially as set forth.

WILLIAM H. PLUMB.

Witnesses:
PAUL GOEPEL,
C. SEDGWICK.